United States Patent Office 3,342,549
Patented Sept. 19, 1967

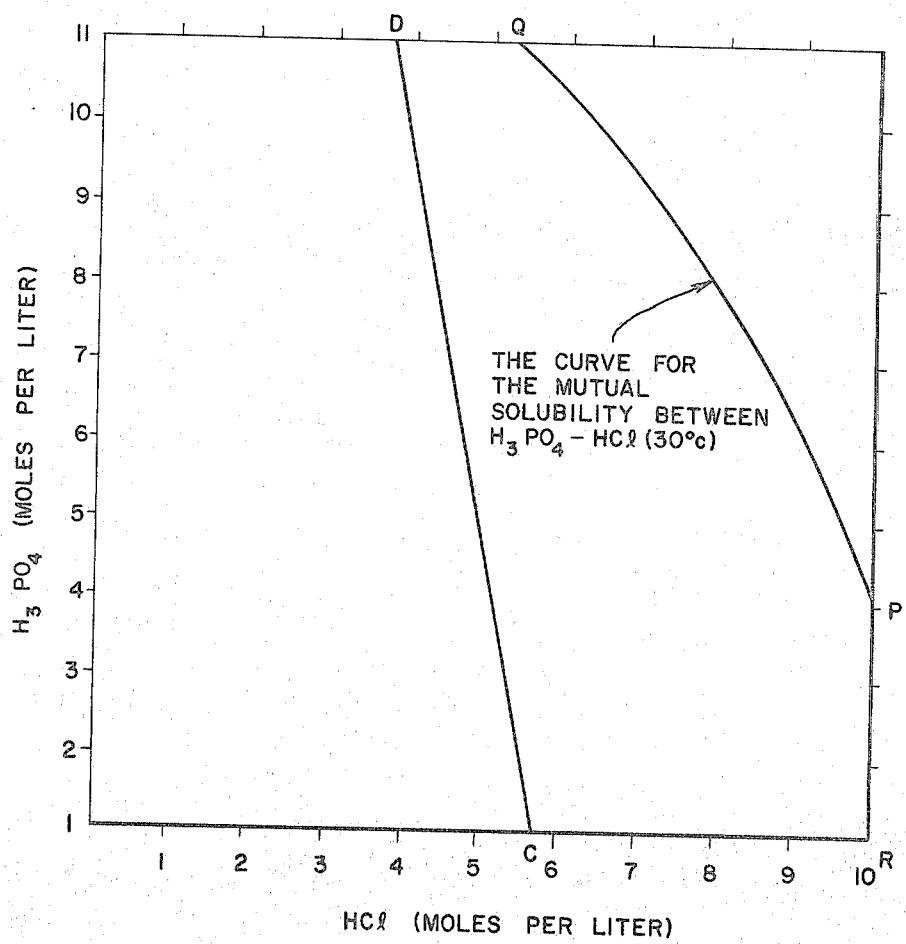

3,342,549
PROCESS FOR REFINING PHOSPHORIC ACID PREPARATIONS
Toshio Sakomura and Mitsuo Kikuchi, Tsuno-gun, Yamaguchi-ken, and Hiroshi Shimizu, Tokyo, Japan, assignors to Togo Soda Mfg. Co., Ltd., and Japan Organo Co. Ltd., Tokyo, Japan
Filed Dec. 21, 1965, Ser. No. 515,335
Claims priority, application Japan, Nov. 10, 1960, 35/45,131; Aug. 18, 1961, 36/29,894
2 Claims. (Cl. 23—165)

ABSTRACT OF THE DISCLOSURE

There is provided a process for the removal of iron and arsenic from crude phosphoric acid. The process comprises mixing the crude phosphoric acid with hydrochloric acid, contacting the mixture with a strongly basic anion exchange resin to adsorb onto the exchange resin substantially all the iron impurity and a portion of the arsenic impurity contained in the crude phosphoric acid, and concentrating by evaporation the partially purified phosphoric acid separated from the exchange resin to remove by evaporation the remaining arsenic impurity and the hydrochloric acid.

---

The present application is a continuation-in-part of copending application Serial No. 150,089, filed on November 3, 1961, now abandoned.

The present invention relates to a process for removing iron and arsenic impurities from phosphoric acid produced e.g. by the so-called wet process.

In general, commercially available phosphoric acid is manufactured by two methods. One method is the "dry method," the other is the "wet process" method. Phosphoric acids used for industrial purposes have been heretofore, without exception, produced by the dry process, because phosphoric acid produced by the wet process contains a great deal of impurities and, therefore, could only be used as a raw material for fertilizers and certain types of phosphate compounds.

Of the impurities contained in the phosphoric acid produced by the wet process, the most serious are iron and arsenic because the presence of these impurities is what has restricted the industrial use of wet process phosphoric acid. It is, therefore, not surprising that a great deal of research has been done in an attempt to discover an adequate method for removing iron and arsenic from phosphoric acid. One process which has been developed involves charging the phosphoric acid with hydrogen sulfide gas, thereby precipitating the arsenic as $As_2S_3$ or $As_2S_5$.

After the $As_2S_3$ or $As_2S_5$ is precipitated, the excess hydrogen sulfide is expelled, whereby fine sulfur particles are produced. Since it is very difficult to filter these sulfur particles, this method is not satisfactory for industrial use.

As to the removal of iron from phosphoric acid, no satisfactory method has yet been developed.

A satisfactory purification process for phosphoric acid must be capable of producing a phosphoric acid containing not more than 1 part per million (herein p.p.m.) of iron nor more than 1 p.p.m. of arsenic and, moreover, must do so in an economic manner.

The primary object of the present invention is the embodiment of a process for removing iron and arsenic from wet process phosphoric acid which fulfills the enumerated desiderata.

More particularly, it is an object of the present invention to embody a process in which the iron and arsenic content of wet process phosphoric acid can be reduced to 1 p.p.m. or less.

Another object of the present invention is to provide a process for the removal of iron and arsenic from dilute phosphoric acid so that the iron and arsenic content, individually, is 1 p.p.m. or less and, concurrently, produce a concentrated phosphoric acid.

Other objects of the present invention will be apparent from the following description and appended drawing.

Briefly stated, the present invention essentially realizes the aforementioned objects by adding an appropriate amount of hydrogen chloride, either as a gas or as an aqueous solution, to the phosphoric acid, contacting the thus-produced acid mixture with a strongly basic anion exchange resin, and concentrating the mixed acid by, e.g. evaporation, thereby forming volatile $AsCl_3$ from any arsenic remaining in the mixed acid.

During the concentration the arsenic is volatilized and removed from the system together with hydrochloric acid. Thus, it is possible to remove iron and arsenic from a solution of dilute phosphoric acid, such as the acid produced by the wet process. It is, therefore, possible to purify and concentrate the dilute phosphoric acid.

The present invention is founded, inter alia, on the discovery that iron can more effectively be removed from an acid mixture (herein mixed acid) having a certain ratio of phosphoric acid and hydrochloric acid, by contacting the mixed acid with a strongly basic anion exchange resin.

This mixed acid can be easily prepared by introducing hydrogen chloride gas into a solution of phosphoric acid or into a mixed solution of phosphoric acid and hydrochloric acid, or by mixing an aqueous hydrochloric acid solution with the phoshoric acid.

As noted supra, by the process of this invention, it is possible to remove iron to the extent that the iron content of the phosphoric acid solution, or the mixed solution of phosphoric acid and hydrochloric acid, is less than 1 p.p.m. When removing arsenic as well as iron from the dilute phosphoric acid, the content of iron and arsenic in the phosphoric acid may be lowered to less than 1 p.p.m. At the same time, it is possible to concentrate the dilute phosphoric acid.

In accordance with the present invention, the mixture of phosphoric acid and hydrochloric acid is produced by blowing hydrogen chloride gas into dilute phosphoric acid or by mixing an aqueous hydrochloric acid solution with dilute phosphoric acid, and the thus produced acid mixture is contacted with an anion exchange resin. At this time, the higher the concentration of hydrochloric acid in the mixed acid, the easier iron can be removed from the mixture by anion exchange resins. Further, a smaller amount of the strongly basic anion exchange resin is required for the removal of iron. Moreover, it has been found that, even if the concentration of hydrochloric acid remains in the same degree, the higher the concentration of phosphoric acid, the more iron is adsorbed by the same amount of resin.

As shown in the tables infra (Tables 1 and 2), when the concentration of phosphoric acid is low and the concentration of hydrochloric acid is increased, a smaller amount of resin is required. The data in said tables also shows that the higher the concentration of phosphoric acid, the easier it is to remove iron, even if the concentration of hydrochloric acid is less.

This result is illustrated by the fact that neither cation exchange resins nor anion exchange resins will remove iron from a phosphoric acid solution per se, but rather, the anion exchange resin removes iron only from a mixed solution of phosphoric acid and hydrochloric acid. This is believed to be due to the fact that iron, in the acid mixture is in the form of an anionic complex, probably a chloroferric complex, and the phosphoric acid in the acid mixture acts as an accelerator for formation of said complex anion.

When the concentration of phosphoric acid is high, a smaller amount of hydrochloric acid is sufficient. In addition, as the solubility of hydrochloric acid in phosphoric acids is less at higher temperatures, hydrochloric acid can be recovered as hydrochloric acid gas merely by raising the temperature. However, an extremely high concentration of phosphoric acid is not advisable since the amount of hydrochloric acid gas absorbed by phosphoric acid is limited.

Therefore, in forming the aforementioned acid mixture, it is preferable that the concentration of phosphoric acid and hydrochloric acid in the mixture be in the range of 1 to 11 moles per liter (herein mol/l.) and 10 to 4 mol/l., respectively.

The amount of phosphoric acid contained in the crude product produced by the wet process is generally 3 to 6 mol/l. This must be purified and concentrated up to about 85% (by weight), in order to produce an industrial grade of phosphoric acid. According to this invention, a mixture of acids is prepared by charging hydrogen chloride gas into the dilute phosphoric acid and then the thus-obtained mixture is contacted with a strongly basic anion exchange resin.

All of the iron and part of the arsenic is removed in the above steps. In the concentrating step, the remaining arsenic can be removed, together with hydrogen chloride, and concentrated phosphoric acid free from iron, arsenic and hydrogen chloride is obtained.

As mentioned above, in the prior method for removing arsenic it is necessary to precipitate and separate the arsenic as $As_2S_3$ or $As_2S_5$. According to this invention, this is not required because when the mixed acid is treated with the aforementioned anion exchange resin, a part of the As is adsorbed upon the resin and removed together with iron. The removal of the remaining arsenic is completed in the later process of concentration.

When hydrochloric acid is adsorbed, arsenic is considered to exist in the form of $AsCl_3$. As seen in the table below, $AsCl_3$ (arsenic trichloride) is volatile and, therefore, expelled from the system during the concentration step.

| Temperature (° C.): | Vapor pressure (mm. Hg) |
|---|---|
| 61.1 | 145.1 |
| 83.4 | 270.6 |
| 101.1 | 452.2 |
| 122.0 | 776.0 |

The strongly basic anion exchange resins which are preferably employed in this invention are those which are of the strongly basic type by virtue of polar quarternary ammonium groups in the molecular structure of the resins.

The polar groups are quarternary ammonium chloride groups. It is preferred to start the process with a resin which is in the chloride form but it is emphasized that a resin in any other form, such as the hydroxyl form or phosphate form, can be used since it is immediately converted to the chloride or phosphate form when brought into contact with the mixed acid.

As has been pointed out hereinbefore, the amount of iron which can be efficiently removed is dependent upon the relative concentrations of phosphoric acid and hydrochloric acid.

The most favorable concentrations of phosphoric acid and hydrochloric acid are shown in the drawing.

In this drawing the concentration of phosphoric acid in the acid mixture is plotted as the ordinate and the concentratoin of hydrochloric acid in the mixed acid, as the abscissa.

The concentration of the composition of mixed acid solution within which iron is removed profitably for industrial availability when using the strongly basic anion exchange resin is in the area bounded by the lines connecting the points C, D, Q, P and R as shown in the attached drawing wherein the line CD is a straight line that joins the point C, which corresponds to a composition containing 1.0 mole per liter of $H_3PO_4$ and 5.75 moles per liter of HCl and the point D which corresponds to a composition containing 11.0 moles per liter of $H_3PO_4$ and 3.75 moles per liter of HCl and the curve PQ represents the mutual solubility of phosphoric acid and hydrochloric acid at 30° C.

The following examples are presently preferred embodiments. All percentages are by weight, unless otherwise indicated.

Example 1

A series of aqueous mixed acid solutions containing orthophosphoric acid and hydrochloric acid were prepared as shown in Table 1 and Table 2.

Each of the mixed acids contained 250 milligrams per liter (herein mg./l.) of ferric ion in a state of equilibrium after contacting with resins. 400 ml. of each of the said mixed acids were contacted, with agitation for five hours, with one gram of Amberlite (registered trademark) IRA-400 (catalogue name), which is a strongly basic anion exchange resin of the quarternary ammonium type. This resin was in the chloride form and is readily obtainable. See, for example, the textbook, "Ion Exchangers in Organic and Biochemistry," Interscience Publishers Inc., New York, 1957, page 118.

The mixed acid solutions were separated from the resin, and the content of Fe in the solutions determined.

The adsorbed amount of Fe was calculated and is shown in millimoles of Fe per one gram of dry resin.

The results obtained in the experiment are shown in Table 1 and Table 2.

TABLE 1

| Composition of mixed acid | | Adsorbed amount, Fe millimol/g. dry resin |
|---|---|---|
| $H_3PO_4$, mol/l. | HCl, mol/l. | |
| 3.9 | 4.1 | 0.13 |
| 4.0 | 6.0 | 0.80 |
| 4.1 | 7.9 | 1.97 |
| 4.0 | 10.0 | 2.20 |

TABLE 2

| Composition of mixed acid | | Adsorbed amount, Fe millimol/g. dry resin |
|---|---|---|
| $H_3PO_4$, mol/l. | HCl, mol/l. | |
| 0 | 6.2 | 0.78 |
| 4.0 | 6.0 | 0.80 |
| 6.0 | 6.1 | 1.01 |
| 8.1 | 6.0 | 1.30 |
| 10.0 | 6.0 | 1.73 |

Table 1 shows the effect of hydrochloric acid concentration on the amount of adsorbed ferric ion and Table 2 shows the effect of phosphoric acid concentration on the amount of adsorbed ferric ion.

From the foregoing data it is apparent that the higher the concentration of hydrochloric acid in the mixed acid, the easier the iron can be removed from the said mixed acid by contacting with anion exchange resins.

Further, a smaller amount of the strongly basic anion exchange resin is required for the removal of iron. Furthermore, the higher the concentration of phosphoric acid in the mixed acid, the easier the iron can be removed from the said mixed acid by contacting with anion exchange resins.

The phosphoric acid in the mixed acid acts as an accelerator on the removal of iron. (See Table 2.)

Example 2

A series of aqueous mixed acid solutions containing orthophosphoric acid and hydrochloric acid, as shown in Table 3, were prepared.

Each of the mixed acids contained 250 mg./l. of ferric ion in a state of equilibrium after contacting with resins. 400 ml. of each of the mixed acids were contacted, with agitation for five hours, with one gram of Amberlite in the chloride form.

The mixed acid solutions were separated from the resin, and the content of Fe in the solutions were determined.

The adsorbed amount of Fe was calculated and was shown in millimoles of Fe per one gram of dry resin.

The results obtained in the experiment are shown in Table 3.

TABLE 3

| Composition of mixed acid | | Amount of iron adsorbed, Fe millimol/g. dry resin |
|---|---|---|
| HCl, mol/l. | $H_3PO_4$, mol/l. | |
| 2 | 0 | <0.01 |
| 2 | 4 | <0.01 |
| 2 | 6 | 0.01 |
| 2 | 8 | 0.02 |
| 2 | 10 | 0.03 |
| 4 | 0 | 0.13 |
| 4 | 4 | 0.13 |
| 4 | 6 | 0.15 |
| 4 | 8 | 0.25 |
| 4 | 10 | 0.70 |
| 5 | 0 | 0.30 |
| 5 | 4 | 0.34 |
| 5 | 6 | 0.48 |
| 5 | 8 | 0.87 |
| 5 | 10 | 1.20 |
| 6 | 0 | 0.75 |
| 6 | 4 | 0.80 |
| 6 | 6 | 1.01 |
| 6 | 8 | 1.30 |
| 6 | 10 | 1.73 |
| 7 | 0 | 1.20 |
| 7 | 4 | 1.31 |
| 7 | 6 | 1.50 |
| 7 | 8 | 1.55 |
| 7 | 10 | X |
| 8 | 0 | 1.85 |
| 8 | 4 | 1.97 |
| 8 | 6 | 2.04 |
| 8 | 8 | X |
| 9 | 0 | 2.12 |
| 9 | 4 | 2.20 |
| 9 | 6 | X |
| 10 | 0 | 2.40 |
| 10 | 4 | 2.45 |
| 10 | 6 | X |
| 5.75 | 1 (Point C) | 0.50 |
| 3.75 | 11 (Point D) | 0.54 |
| 10 | 4 (Point P) | 2.45 |
| 5.25 | 11 (Point Q) | 1.50 |
| 10 | 1 (Point R) | 2.42 |

The symbol X in the above table signifies that it is impossible to prepare such a composition of mixed acid at room temperature (30° C.) due to the limited solubility of hydrochloric acid in phosphoric acid.

Anion exchange resin, Amberlite IRA-400, was used in chloride form in this example.

The maximum adsorbing capacity for the anion in this resin was determined and its value was about 2.5 milliequivalents per one gram of dry resin.

The amount of iron adsorbed in mixed acids having the following compositions: HCl 2 mol/l. and $H_3PO_4$ 0 mol/l., HCl 2 mol/l. and $H_3PO_4$ 4 mol/l., HCl 2 mol/l. and $H_3PO_4$ 6 mol/l., HCl 2 mol/l. and $H_3PO_4$ 8 mol/l., and HCl 2 mol/l. and $H_3PO_4$ 10 mol/l., was less than 0.01, less than 0.01, 0.01, 0.02, and 0.03 respectively, and the amount of iron adsorbed was low comparable to the maximum adsorbing capacity of resin.

Example 3

Hydrogen chloride gas was charged into crude phosphoric acid having a concentration of 3.1 mol/l. of $H_3PO_4$. While this was taking place the solution was cooled with water.

A mixed acid was obtained having the following composition:

$H_3PO_4$ _____ mol/l__ 2.7
HCl _____ mol/l__ 9.0
Fe _____ mg./l__ 226.7
As _____ mg./l__ 2.2

2.3 liters of the mixed acid was then passed, at a flow rate of 1-1.5 ml./min., through a column filled with Amberlite in the chloride form. The said Amberlite filled in the column had a diameter of 20 mm., a height of 87 mm. and an approximate volume of 28 ml.

The average concentration of Fe in the treated solution which flowed through the column was 0.2 mg./l. Arsenic in the same treated solution was 1.8 mg./l. After the mixed acid was treated, the column was next treated with about 80 ml. of water at a flow rate of 10 ml./min., to regenerate ion exchange resin. 416 mg. of Fe adsorbed on the resin was eluted, and then the residual iron, 103 mg., was completely eluted, by passing 50 ml. of one normal HCl through the column at a flow rate of 10 ml./min. The arsenic adsorbed was eluted by the first regeneration. By evaporating the mixed acid solution in an evaporating flask, phosphoric acid having the following composition was obtained:

$H_3PO_4$, weight percent _____ 85
HCl, percent _____ 0.1
Fe, p.p.m. _____ 0.7
As, p.p.m. _____ 0.01
Volume, ml. _____ 417
Weight, g. _____ 710
Specific gravity _____ 1.7

By blowing hot air in the phosphoric acid, the $H_3PO_4$ content was raised to 89% and the HCl content was reduced to 5 p.p.m. or less.

When the phosphate form and hydroxyl form of anion exchange resin was used in the above described operation, the same results were obtained.

Example 4

A mixed acid solution having the following composition:

$H_3PO_4$ _____ mol/l__ 5.90
HCl _____ mol/l__ 8.00
Fe _____ mg./l__ 285
As _____ mg./l__ 3.5 was passed through a column (volume of resin is 20 ml.) filled with strongly basic anion exchange resin Amberlite in the phosphate form at a flow rate of 1.0 ml./min. As a result, an effluent, the first 3.4 liters of which contained 0 mg. Fe/l., was obtained. After the flow ceased, the mixed acid solution in the column was replaced with 30% hydrochloric acid. The hydrochloric acid was then removed through the bottom of the column. Then 300 ml. of water was fed into the bottom of the column at an upward flow rate of 10 ml./min. The resin was washed and regenerated. 960 mg. of Fe was eluted. This corresponds to 99% of adsorbed Fe.

The iron-free acid solution (the mixed acid treated with the aforementioned anion exchange resin) had the following composition:

$H_3PO_4$ _____ mol/l__ 5.90
HCl _____ mol/l__ 8.00
Fe _____ mg./l__ <0.1
As _____ mg./l__ 3.0

2.3 liters of this iron-free acid solution was concentrated in the same manner as in Example 3 and phosphoric acid was obtained. It had the following composition:

| | |
|---|---|
| $H_3PO_4$, weight percent | 84 |
| HCl, percent | 0.15 |
| Fe, p.p.m. | <0.1 |
| As, p.p.m. | <0.02 |
| Volume, ml. | 945 |
| Weight, kg. | 1.58 |
| Specific gravity | 1.67 |

This phosphoric acid was concentrated by blowing in hot air at 120° C., and then concentrated phosphoric acid, free from Fe and As, of the following composition was obtained.

| | |
|---|---|
| $H_3PO_4$, weight percent | 90 |
| HCl, percent | <0.0005 |
| Fe, p.p.m. | <0.1 |
| As, p.p.m. | <0.02 |
| Weight, kg. | 1.48 |
| Specific gravity, 20° C. | 1.728 |

In this example the phosphate form of the resin was used, however, when the chloride form or the hydroxyl form was employed in the above described operation, the same results were obtained.

Having thus disclosed the invention what is claimed is:

1. A process for removing iron and arsenic from crude phosphoric acid, which comprises charging said crude phosphoric acid with hydrochloric acid, mixing strongly basic anion exchange resin with the resultant mixture, separating the strongly basic anion exchange resin containing substantially all the iron impurity and part of the arsenic impurity from the partially purified phosphoric acid mixture, and concentrating said partially purified phosphoric acid mixture by evaporation, thereby removing substantially all the hydrochloric acid and remaining arsenic by evaporation to produce concentrated phosphoric acid.

2. A process according to claim 1 wherein the mixture of phosphoric acid and hydrochloric acid contains phosphoric acid and hydrochloric acid in concentrations falling within the area bounded by the lines connecting the points C, D, Q, P, and R as shown in the appended drawing.

References Cited

UNITED STATES PATENTS

| | | | |
|---|---|---|---|
| 2,415,797 | 2/1947 | Low | 23—165 |
| 2,695,875 | 11/1954 | McGarvey | 210—24 |
| 2,830,874 | 4/1958 | Long et al. | 23—18 |
| 2,955,918 | 10/1960 | Ruehrwein | 23—165 |

OSCAR R. VERTIZ, *Primary Examiner.*

O. F. CRUTCHFIELD, A. GRIEF, *Assistant Examiners.*

UNITED STATES PATENT OFFICE
CERTIFICATE OF CORRECTION

Patent No. 3,342,549                      September 19, 1967

Toshio Sakomura et al.

It is hereby certified that error appears in the above numbered patent requiring correction and that the said Letters Patent should read as corrected below.

In the heading to the printed specification, line 6, for "Togo Soda Mfg. Co., Ltd." read -- Toyo Soda Mfg. Co., Ltd. --.

Signed and sealed this 29th day of October 1968.

(SEAL)
Attest:

Edward M. Fletcher, Jr.

Attesting Officer

EDWARD J. BRENNER

Commissioner of Patents